United States Patent

[11] 3,614,439

| [72] | Inventors | Victor Beelik, Jr.<br>Van Nuys;<br>Jerome J. Rosenblatt, Woodland Hills, both of Calif. |
|---|---|---|
| [21] | Appl. No. | 882,948 |
| [22] | Filed | Dec. 8, 1969 |
| [45] | Patented | Oct. 19, 1971 |
| [73] | Assignee | Hughes Aircraft Company<br>Culver City, Calif. |

[54] INFRARED ALIGNING APPARATUS AND METHOD
8 Claims, 3 Drawing Figs.

[52] U.S. Cl. .............................................. 250/83.3HP, 356/138, 356/152
[51] Int. Cl. ........................................................ H01j 39/18
[50] Field of Search ........................................... 356/138, 152; 250/83.3 HP

[56] References Cited
UNITED STATES PATENTS

| 2,213,605 | 9/19.0 | Mathieu | 356/138 |
| 2,380,501 | 7/1945 | Christian et al. | 356/138 |
| 2,464,485 | 3/1949 | Burroughs | 356/138 |
| 2,481,551 | 9/1949 | Williams | 356/138 |
| 3,067,330 | 12/1962 | Hammar | 250/83.3 HP |
| 3,527,534 | 9/1970 | Di Giacomo et al. | 356/138 |

*Primary Examiner*—James W. Lawrence
*Assistant Examiner*—D. C. Nelms
*Attorneys*—James K. Haskell and Allen A. Dicke, Jr.

ABSTRACT: A method for aligning an infrared or night sight with respect to a visible wavelength or day sight comprising holding a plane mirror in front of both sights, orienting the plane mirror so that the day sight points in a direction precisely perpendicular to the mirror, and then orienting the night sight to point perpendicular to the mirror. The night sight has a detector surface which includes a matrix of small detectors of a type which radiate infrared light of the same wavelength to which they are sensitive. The infrared sight is oriented so that light emitted from each detector, and which is reflected back by the mirror, falls on precisely the same detector which emitted it. In order to determine when the night sight is aligned, the detector matrix is constructed so there is no detector at the center of the detector surface.

INVENTORS.
VICTOR BEELIK, Jr.,
JEROME J. ROSENBLATT,
BY
Allen A. Dicke, Jr.,

AGENT.

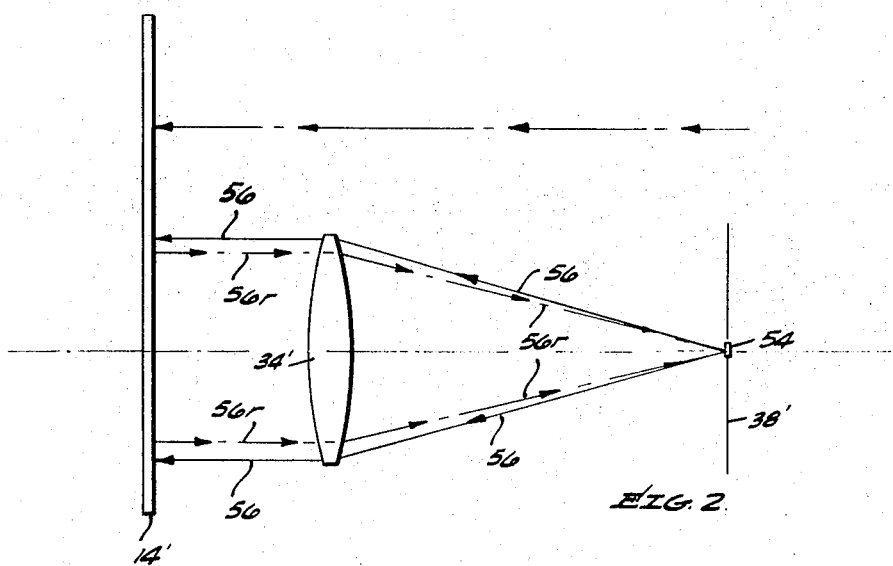
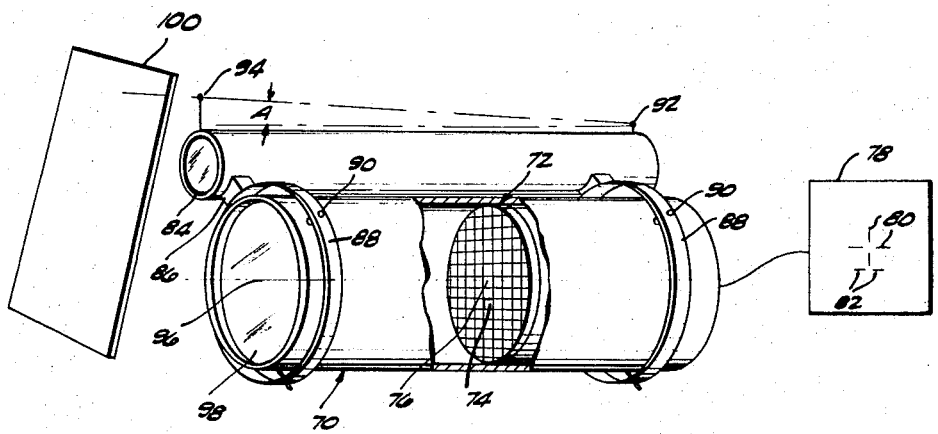

INFRARED ALIGNING APPARATUS AND METHOD

BACKGROUND OF THE INVENTION

1. Field of the Invention

This invention relates to detector systems, and to a method for aligning an infrared sight.

2. Description of the Prior Art

Some advanced weapon systems include a visual sight for aiming weapons during daylight operations, and an infrared sight for aiming them during night operations when the terrain may be illuminated by an infrared searching light. The infrared sight may include a detector surface containing a matrix of small detectors that are sensitive to infrared radiation, a lens for forming an image on the detector surface, an image intensifier for amplifying light from the detector surface, a television camera for viewing the amplified light, and a television receiver for displaying the view. The entire infrared sight is typically heavy and somewhat delicate, so that it is often removed for daylight operations and installed only for nighttime use.

When the infrared sight is installed in a weapon system, it must be accurately aligned with the rest of the system. Typically, the visual wavelength sight which is used for daylight operations is well aligned, and the infrared sight is aligned relative to the daylight sight. Since both optical sights are generally focused for light at infinity, the methods for aligning have generally required using a source of infrared and visual radiation, and either positioning the source at a large distance or using an elaborate collimating system to provide the equivalent apparent distance. Setting up a source in either of these ways is inconvenient.

OBJECTS AND SUMMARY OF THE INVENTION

An object of the present invention is to provide a method for aligning an optical sight with another device, which requires a minimum of effort and special equipment.

Another object is to provide an infrared sighting system which can be aligned in a simple and rapid manner.

In accordance with one embodiment of the present invention, a method is provided for rapidly aligning an infrared sight with a visual wavelength or day sight. A large optically flat mirror is positioned in front of the day sight, and the mirror is oriented so that its plane is precisely perpendicular to the view of the day sight. The infrared sight is then oriented so that its line of sight is precisely perpendicular to the plane of the mirror. Orientation of the infrared sight can be readily accomplished for infrared sights of a type which uses infrared detectors that radiate in the same wavelength to which they are sensitive.

The infrared sight which can be readily aligned in accordance with the invention, includes a detector surface containing a matrix of small detectors that are sensitive to infrared light. The objective lens in front of the detectors forms an image of the target area on the detector surface, and each detector creates visible light at the rear of the detector. A person can view the rear surfaces of the detectors, often through an image intensifier and television camera and receiver. The detectors used in such devices often radiate energy of the same wavelength to which they are sensitive. While in the past this phenomenon has often been a disadvantage, this property is utilized in the present invention to more easily align the detector.

In order to permit easier alignment, the sight is constructed with one detector missing. When the sight is positioned in front of the plane mirror, all detectors generate infrared radiation which passes through the objective lens to the plane mirror and is reflected back onto the detector surface. If the sight is not precisely aligned with the mirror, the observer will see two blank spots, one representing the position of the missing detector which cannot detect radiation, and the other spot representing the image of the missing detector position, where there is no infrared radiation. The observer adjusts the orientation of the sight until the two blank spots coincide. The infrared sight is then precisely aligned with the daylight sight.

The novel features of the invention are set forth with particularity in the appended claims. The invention will be best understood from the following description when read in conjunction with the accompanying drawings.

BRIEF DESCRIPTION OF THE DRAWINGS

FIG. 2 is a diagram showing the principles involved in the alignment method of the invention; and FIG. 3 is a simplified perspective view of a sight constructed in accordance with another embodiment of the invention.

DESCRIPTION OF THE PREFERRED EMBODIMENTS

Figure 1:
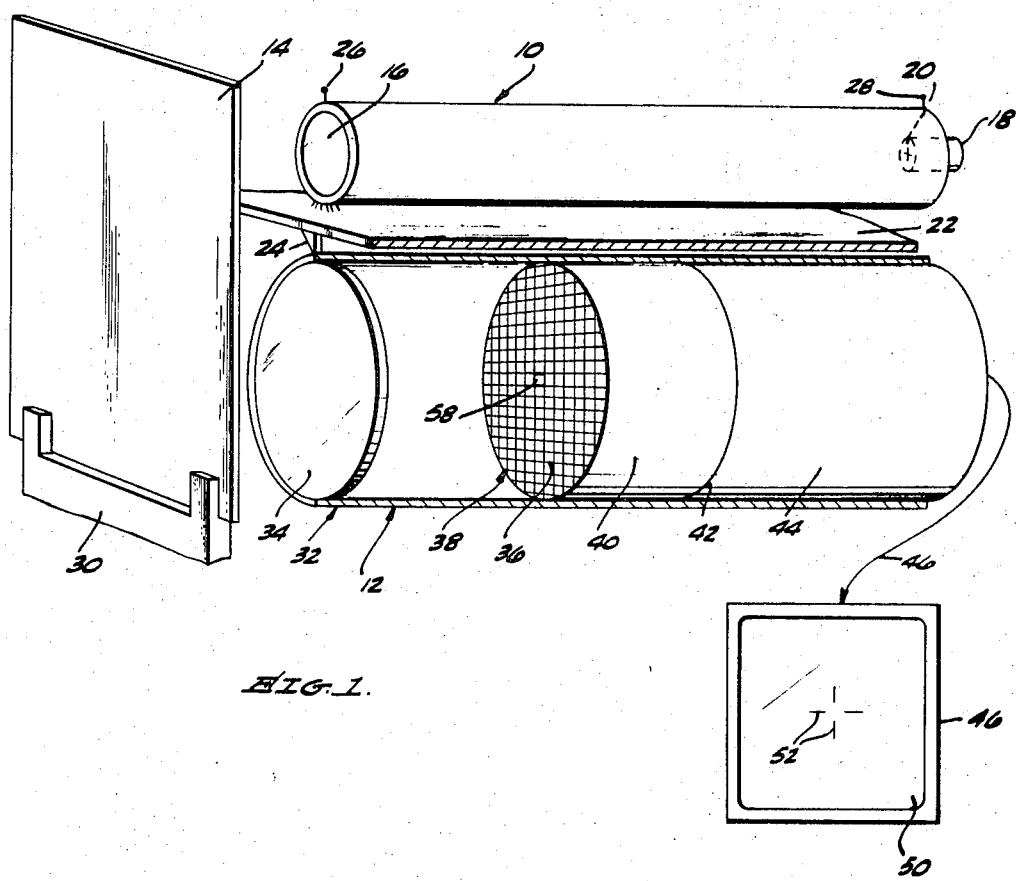
FIG. 1 is a simplified perspective view of a sight constructed in accordance with the invention, showing the method by which it can be aligned with a daylight or visual sight.

FIG. 1 illustrates the method of aligning of the invention, for aligning a daylight or visual sight 10 with an infrared or night sight 12, involving aligning both sights with a plane mirror 14. The daylight sight 10 is a telescope with an objective lens 16 and eyepiece 18, and having a reticle 20 which indicates the exact center of the field of view. The telescope sight 10 is mounted on a frame 22 which may carry a weapon such as a machine gun or rocket launcher, and the weapon is aimed by orienting the frame until the observer who peers through the eyepiece 18 sees the target at the center of the cross hairs of the reticle 20. During nighttime operations the infrared sight 12 is utilized to aim the weapon. The infrared sight 12 is heavy and somewhat delicate, so that it is carried only during night operations. Accordingly, prior to each night operation, the infrared sight must be installed and accurately aligned with the weapon.

The infrared sight 12 is mounted on brackets, one of which is shown in simplified form at 24, which hold it close to a position of precise alignment. However, the parts of the sight and bracket can deform slightly between sight removal and reinstallation, and a boresight alignment is required to assure accuracy. A boresight alignment is that type which aligns the actual center of view of the sight with the bore of the weapon or with a sight which is known to be accurately aligned with the bore. In the apparatus of FIG. 1, the daylight sight 10 is known to be accurately aligned with the bore, and the night sight 12 is aligned with the daylight sight.

In accordance with this invention, the day and night sights 10, 12 are aligned by first positioning an optically flat mirror 14 in front of the day sight 10 and orienting the mirror so that the plane of the mirror is precisely perpendicular to the line of sight or optical axes of the day sight 10. This can be accomplished in several ways, one simple method being to include a pair of bead sight members 26, 28 on the day sight, which are known to be accurately aligned with the day sight. An observer behind the rear bead member 28 views the two bead members from a position wherein they are coincident, and has a helper adjust the position of the plane mirror 14 on a mount 30. The helper adjusts the mirror so that the image of the bead member 26 which the observer sees in the mirror coincides with the bead members which he views directly. While the mirror 14 remains in this position, the observer adjusts the position of the night detector 12 so that it is aligned with the mirror, in a manner to be described below.

The night detector 12 includes a housing 32, an objective lens 34 mounted on the housing, and a matrix of detectors 36 positioned within the housing at the focal plane of the objective lens. Thus, the lens forms an image of distant targets on the detector plane 38, which is the front surface of the matrix 36 of detectors. Each detector has a front surface, on which light may fall, and a back surface which emits electrons at a rate dependent upon the intensity of light within a certain range of wavelengths incident on its front surface. Detectors are chosen which are particularly sensitive to light in the infrared range, to detect target reflections of light from an infrared search light. The electrons emitted from the rear surface of the detectors are multiplied by an image intensifier 40 which has a phosphor screen at its rear face that creates a visual image. A television camera 44 views the image on the phosphor screen, and carries video signals over line 46 to a television receiver 48 which can be viewed by an observer. The receiver 48 has a screen 50 with crosshairs 52 indicating the center of the field of view and the optical axis. When the day and night sights are accurately aligned, the center of field of view indicated by the reticle 20 of the day sight coincides with the center of view indicated by the crosshairs 52 of the night sight so that their axes are parallel.

The detectors 36 are typically constructed of a material such as mercury emits germanium which emits light of the same wavelength to which the detector is sensitive. As shown in FIG. 2, a detector 54 at the center of the detector plane 38' emits infrared light rays 56. Since the detector is at the focal plane of the objective lens 34', these rays 56 emerge from the lens in a direction precisely parallel to each other. When the rays 56 strike the plane mirror 14', they are reflected back to the lens in a direction parallel to the incident rays 56, if the mirror is perpendicular to the line of sight of the detector. The reflected rays 56r are focused on the same detector 54 from which they emerged. Thus, the detector 54 at the center of the image plane "sees" itself in the mirror. In prior detectors, the emissivity of the detectors was a problem since the detectors emit even if they are supercooled, so long as they are above absolute zero. This caused difficulties because radiation from the detectors which is reflected back on themselves can produce noise that interferes with detection of radiation from the target. In this invention, the emissivity of the detectors in the same wavelength to which they are sensitive is usefully employed to help align the sight.

Since the center detector will "see" itself in the plane mirror, one method of aligning the night sight with the plane mirror would be to block out all detectors except the center one, and alter the night sight orientation until light from the center detector was imaged back on itself. Such imaging could be detected by observing the television screen 50 and noting when a bright spot suddenly appeared at the center of the screen. This method would be difficult to perform, however, since it is difficult to block out all but the center detector, and because the observer could not tell in which direction to change the sight orientation so as to bring it closer to alignment, until precise alignment has been achieved.

In accordance with one feature of the invention the sight is constructed so that the exact center portion 58 of the detector matrix is devoid of a detector. This construction is shown in the sight of FIG. 1. In aligning the infrared sight 12 with the mirror 14, the observer viewing the television screen 50, initially sees a faint glow at every region of the screen except for two blank spots near the center. One of these blank spots is at the exact center of the screen as indicated by the crosshair lines 52, and it arises because there is no detector at the center of the matrix of detectors. The other blank spot represents the image of the center portion, and arises because the center portion does not emit appreciable infrared radiation in the range to which the rest of the detectors are sensitive. Accordingly, the image of the detector matrix contains a blank spot, and if the infrared sight is not precisely aligned with the mirror, this spot falls on a detector which is spaced from the exact center of the matrix.

To align the infrared sight, the observer slowly reorients the sight 12 so that the second blank spot moves closer to the exact center of the television screen. When the two blank spots coincide at the center of the screen, the infrared sight 12 is precisely aligned with the mirror 14. Adjusting knobs and the like can be used for precisely changing the orientation of the sight.

The orientation of the plane mirror 14 with the weapon on frame 22 can be accomplished in many ways, besides aligning a pair of bead sight members. If it is desired to align the night or infrared sight with the bore of a weapon, an observer can merely orient the mirror while looking through the bore of the weapon, if it is possible, or with a bead sight directly mounted on the weapon. It is possible to directly align a telescope-type sight 10 with the mirror 14 by peering through the eyepiece 18 and orienting the mirror 14 until one sees that the image of the crosshairs reflected in the mirror is precisely aligned with the crosshairs seen directly. However, the reticle seen in the mirror may not be in focus. A bead sight or the like is generally easier to use.

FIG. 3 illustrates another embodiment of the invention including an infrared sight 70 with a detector surface 72. However, in this sight the detector surface is devoid of a detector portion at an aligning portion 74 that is spaced from the center of the field of view 76. This allows the very center part 76 to contain sensitive detectors, so that a target can be seen well while it is at the center of the field. A television receiver 78 which serves as a visual output means for the sight has crosshairs 80 that indicate the center of field for aiming a weapon. The receiver also has a pair of aligning indicators 82 which indicate a position corresponding to the aligning portion 74 of the detector surface.

The weapon 84 is a rocket launcher which is coupled to a mount, shown in simplified form at 86. The mount has mounting rings 88 for holding the infrared sight, with three adjusting screws 90 on each ring for enabling adjustment of the orientation of the infrared sight. A pair of beads 92, 94 on the weapon serve as sight-aligning means for aligning the weapon with the infrared sight. The beads define a line of sight which is at a predetermined angle A from the direction in which the weapon projects a missile. The angle A is the same as the angle between the aligning portion 74 of the infrared detector surface and the center 96 of the focusing lens 98 in this case for both the optical and infrared sights the sighting axis is different than the optical axis.

To align the infrared sight 70, a plane mirror 100 is positioned in front of it and the beads 92, 94, and the mirror are oriented to be normal to the line of sight defined by the beads. Then, the infrared sight 70 is oriented so that a blank spot appears between the aligning indicators 82 on the television receiver. When the infrared sight is used to aim the weapon 84, the center 76 of the detector surface will receive light from the target area at which the weapon is pointing.

Thus, the invention provides a sighting method for aligning a pair of sighting means, which is especially useful for an infrared sight constructed in accordance with the invention. The alignment of an infrared sight involves orienting it so that light radiated from the detector portions form an image on the same detector portions that radiated the light. Detectors with a continuous surface of photodetecting material, or with discrete elements, can be constructed and aligned in the same manner. Instead of making the aligning portion of the detector surface devoid of a detector, it is possible to use a different type of detector that radiates at a different intensity or different wavelength than the portions surrounding it, as by including a heating element in that detector, the heating element being energized only during alignment. Of course, even a void portion usually radiates at some intensity.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A method for orienting first and second devices where each of said devices has an axis so that their axes are parallel, said second device comprising an infrared sight with a detector surface being irregular so that at least one portion radiates at a different intensity and a visual output that displays an image showing the infrared radiation image on said detector surface, the steps comprising:

positioning said first device with respect to a plane mirror so that its axis is perpendicular to the plane mirror; and positioning said second device with respect to a plane mirror so that its axis is perpendicular to the plane mirror by positioning said second device so that radiance emanating from the one portion which radiates at a different intensity of said detector surface falls on a predetermined area of said detector surface so that is is shown at a location which is predetermined by the position of the different detector surface on the visual output display.

2. The method for orienting of claim 1 wherein the step of positioning said second device comprises:

positioning said second device with respect to the plane mirror so that its axis is perpendicular to the plane mirror by positioning said second device so that radiance radiating from each portion of said detector surface falls on the portion of the detector surface which radiated it.

3. A method for orienting first and second devices wherein each of said devices has an axis so that their axes are parallel, said second device comprising an infrared sight with a detector surface, a majority of which surface radiates in the same wavelength band that it detects, and visual output that displays an image showing the infrared radiation image on said detector surface, said detector surface being irregular so that at least one portion radiates at a different intensity than other portions, the steps comprising:

positioning said first device with respect to a plane mirror so that its axis is normal to the surface of the plane mirror;

positioning said second device with respect to the same plane mirror so that its axis is normal to the plane of the mirror by positioning the second device so that the radiance of the one portion which radiates at a different intensity is reflected by the mirror and falls back upon the one portion.

4. The method described in claim 3 wherein:

substantially all portions of the surface of said detector means are constructed to radiate and detect radiation primarily within the same band of wavelengths, except said aligning portion which comprises a portion nonresponsive to the wavelength so that a pair of blank spots are normally observed when said second sight is positioned in front of said mirror to detect its own image, one of the blank spots resulting from the nonresponsive portion and the other from the reflection thereof; and said step of positioning said second sight means comprises orienting said second sight means relative to said mirror means so that said blank spots coincide.

5. A method for aligning first and second sight means, wherein the second sight means includes detector means having a detecting surface which radiates energy in substantially the same wavelength to which it is sensitive and lens means for forming an image of distant objects on said detector surface comprising:

aligning a plane mirror means with said first sight means so that said first sight means points in a direction precisely perpendicular to the plane of said mirror means; and positioning said second sight means in front of said mirror means and orienting said second sight means relative to said mirror means so that the radiation from a predetermined aligning portion of said detector surface is deflected back precisely to said aligning portion of said detector surface.

6. A sight comprising:

a housing;

means defining a detector surface constructed so that most of said surface radiates energy of substantially the same wavelength to which it is sensitive;

lens means for forming an image of distant objects on said detector surface; and means for forming a visual image representing the image formed on said detector surface;

said means defining a detector surface being constructed with a small aligning portion with detectably different energy radiation characteristics than the rest of said detector surface.

7. The sight described in claim 6 wherein:

said means for forming a visual image includes means indicating a predetermined center of its field of view; and said aligning portion is located at a position corresponding to said predetermined center.

8. The sight described in claim 6 wherein:

said aligning portion is devoid of material which detects radiant energy.